United States Patent [19]

Hollingsworth

[11] 4,291,957

[45] Sep. 29, 1981

[54] GRAPHIC FORMING DEVICE WITH TOGGLE CLAMPED LAMP ARM

[75] Inventor: Elmont E. Hollingsworth, St. Paul, Minn.

[73] Assignee: Minnesota Mining and Manufacturing Company, St. Paul, Minn.

[21] Appl. No.: 104,651

[22] Filed: Dec. 17, 1979

[51] Int. Cl.³ .......................................... B41B 19/00
[52] U.S. Cl. ...................................................... 354/14
[58] Field of Search ...................................... 354/5–17

[56] References Cited

U.S. PATENT DOCUMENTS

| | | | |
|---|---|---|---|
| 2,762,277 | 9/1956 | McChesney | 354/17 |
| 3,828,359 | 8/1974 | Vogelgesang et al. | 354/15 |
| 3,914,775 | 10/1975 | Vogelgesang et al. | 354/15 |
| 4,141,632 | 2/1979 | Mitchell | 354/14 |

*Primary Examiner*—Donald A. Griffin
*Attorney, Agent, or Firm*—Cruzan Alexander; Donald M. Sell; William L. Huebsch

[57] ABSTRACT

A device for composing graphics comprising a flash lamp for irradiating portions of strip material through a template when an arm supporting the lamp is moved to an exposure position at an exposure station. The template is pressed against the strip at the exposure station between a resilient frame-mounted pad and a transparent plate on the lamp arm by a toggle linkage between the frame and the arm. The template has a rectangular array of windows and is manually positionable on locating pins at the exposure station for different exposures. A positive image of each window is provided on the template, and the locating pins are movable via movement of the lamp arm from a preview position where the image is at the exposure station so the operator can see where the graphic will be formed to an exposure position with the associated window located at the exposure station for exposure. The template also has a code for each window optically readable by the device so that means in the device will advance the strip material a predetermined distance to provide appropriate spacing between graphics along the strip material.

2 Claims, 13 Drawing Figures

GRAPHIC FORMING DEVICE WITH TOGGLE CLAMPED LAMP ARM

BACKGROUND OF THE INVENTION

This invention relates to a device for forming graphics such as letters, numbers and symbols and in one aspect to a device for forming graphics by light exposure through a template onto a strip material.

U.S. Pat. No. 3,914,775 described a device that forms graphics which are made immediately visible along a strip material. The device is adapted to use a composite strip material, more completely described in U.S. Pat. No. 4,123,578 (the content thereof is incorporated herein by reference). Briefly, that strip material comprises a receiving web carrying a firmly adhered layer of waxy material having a predetermined softening temperature above normal room temperature, and a donor web carrying a lightly adhered layer of colored microgranules in face-to-face contact with the layer of waxy material. One of the layers bears a radiation absorbing pigment. When the layers are positioned in intimate contact, and the strip material is momentarily exposed to intense radiation in a graphic pattern, the radiated pigment is heated and softens the adjacent portion of the waxy layer. The softened waxy material adheres to the microgranules upon solidification, and when the webs are separated the colored microgranules transfer to the receiving web in accordance with the pattern of radiation.

The device described in U.S. Pat. No. 3,914,775 includes means for positioning a portion of the strip material at an exposure station with the layers in face-to-face contact and a thin template having a radiation transmissive window in the shape of a graphic to be formed mounted to register the window at the exposure station adjacent the strip material. Means are provided at the exposure station for pressing the strip material and template in intimate contact, and a lamp is provided for irradiating the clamped strip material through the window to form a graphic on the strip material which corresponds to the window by pivotal movement of a lamp arm at the end of which the lamp is mounted from a normal position spaced from the exposure station to afford visible inspection of the template and the portion of the strip material at the exposure station, and an exposure position with the lamp closely adjacent the exposure station at which expose position the lamp is operated.

While the device described in U.S. Pat. No. 3,914,775 can form graphics having such good resolution that even half-tone photographs can be reproduced, it requires the operator to manually set the spacing between successive graphics formed along the strip material with the aid of guide marks on the template at the exposure station. Also, that device requires that the portion of the template in which the window is located be positioned under a transparent plate fixed to a frame of the device at the exposure station, adjacent a movable plunger in the base of the device for pressing the strip material and template portion against the plate. In one embodiment that disadvantage is reduced by using a circular template having a plurality of windows in circular array about its periphery, and rotatably mounting the circular template on the device so that any one of the windows can be rotated into position at the exposure station. Such circular templates, however, are very large for the amount of windows provided thereon, and thus are wasteful of both template material for the manufacturer and storage space for the user. While U.S. Pat. No. 3,828,359 describes a device of the type described above that uses more compact rectangular templates, that template contains only one graphic, is in the form of a slide, and requires the operator to perform the task of inserting the slide under the glass plate for each use of the device.

Also, both of these templates require the operator to visually evaluate spacing between the last graphic formed along the strip material and the next graphic to be formed by comparing a positive graphic already formed on the strip material and a negataive image of the next graphic to be formed on the template portion at the exposure station, which comparison causes difficulty in making manual adjustments that may be desirable for better appearing spacing between adjacent letters, especially between those letters which do not have vertical adjacent edges.

SUMMARY OF THE INVENTION

The present invention provides a device of the type described above for forming a series of graphics such as letters, symbols, or pictures along a strip of radiation sensitive material, which device utilizes a relatively compact flexible template having a plurality of windows thereon, which template (1) can be easily inserted or removed from the device to select a desired graphic; (2) cooperates with novel means in the device to provide automatic predetermined spacing between graphics; and (3) shows the user a positive image of the graphic that will be next formed on the strip material to allow such manual adjustment of the automatic spacing as may be desired to provide the proper appearance between graphics, particularly between those that do not have vertical adjacent edges.

Like the device described in U.S. Pat. No. 3,914,775, the device according to the present invention comprises (1) means adapted for moving the strip of material through an exposure station on a frame for the device to position a predetermined portion of the strip at the exposure station; and (2) means for momentarily irradiating the portion of the strip material at the exposure station in a sharply defined graphic pattern, including a template comprising a thin radiation transparent member with a radiation blocking coating having sharply defined open areas corresponding in shape to graphics to be formed to provide radiation transmissive windows through the template, means for mounting the template on the device to register a desired one of the windows at the exposure station, means for releasably pressing the template into intimate contact with the portion of the strip material at the exposure station, and means for briefly irradiating the portion of strip material at the exposure station through the aligned window comprising a flash lamp, an arm supporting the lamp at one end to move the lamp between a normal position spaced from the exposure station to afford visible inspection of the template and the adjacent portion of the strip material, and an expose position wih the lamp closely adjacent the exposure station and means for activating the flash lamp and the pressing means when the lamp arm is moved to its expose position.

In the device according to the present invention, however, the means for pressing the template against the strip comprises a resilient pad supported on the frame at the exposure station under the strip material, a transparent plate on the lamp arm, which plate has one surface adapted to engage the template over the strip material opposite the resilient pad with the lamp being supported adjacent the other surface of the plate, a toggle linkage between the frame and the arm, and a pivotably mounted activating lever adapted to engage and straighten the toggle linkage upon manual pivoting of the activating lever to press the plate toward the pad. With this means for pressing there is no need to position the template portion to be used under a transparent plate before the lamp arm is lowered, as with the prior art devices, so that templates can be more easily positioned at and removed from the device. Thus it is practical to utilize a template with a more compact rectangular array of windows and to manually reposition the template at the exposure station for each different exposure.

Additionally, in the device according to the present invention, for each of the windows in the template the template has an optically readable code (which code in the preferred embodiment is a spacing opening having a predetermined width related to the width of the window but which, alternatively, could be any other optically readable code such as a bar code related to the width of the window); and the device includes advancing means for optically sensing the code associated with the window at the exposure station and for operating the means adapted for moving the strip material to advance the strip material along the path a distance related to the code upon movement of the lamp between its expose and normal positions to provide a predetermined amount of space between graphics despite the width of the graphic formed.

Also in the device according to the present invention the template has a positive image of each window within an adjacent viewing opening, and the template is mounted on locating members movable via movement of the lamp arm between (1) a preview position with the positive image positioned at the exposure station when the lamp arm is in its normal position so that the operator can accurately preview the position along the strip to make any changes in spacing he may desire prior to forming of the graphic, and (2) an exposure position with the associated window located at the exposure station when the lamp arm is in its expose position so that the strip material will be properly exposed

BRIEF DESCRIPTION OF THE DRAWING

The invention will be further described with reference to the accompanying drawing wherein like numbers refer to like parts in the several views, and wherein:

FIG. 9 is an enlarged fragmentary sectional view taken approximately along the line 9—9 of FIG. 5;

DESCRIPTION OF THE PREFERRED EMBODIMENT

Figure 1:
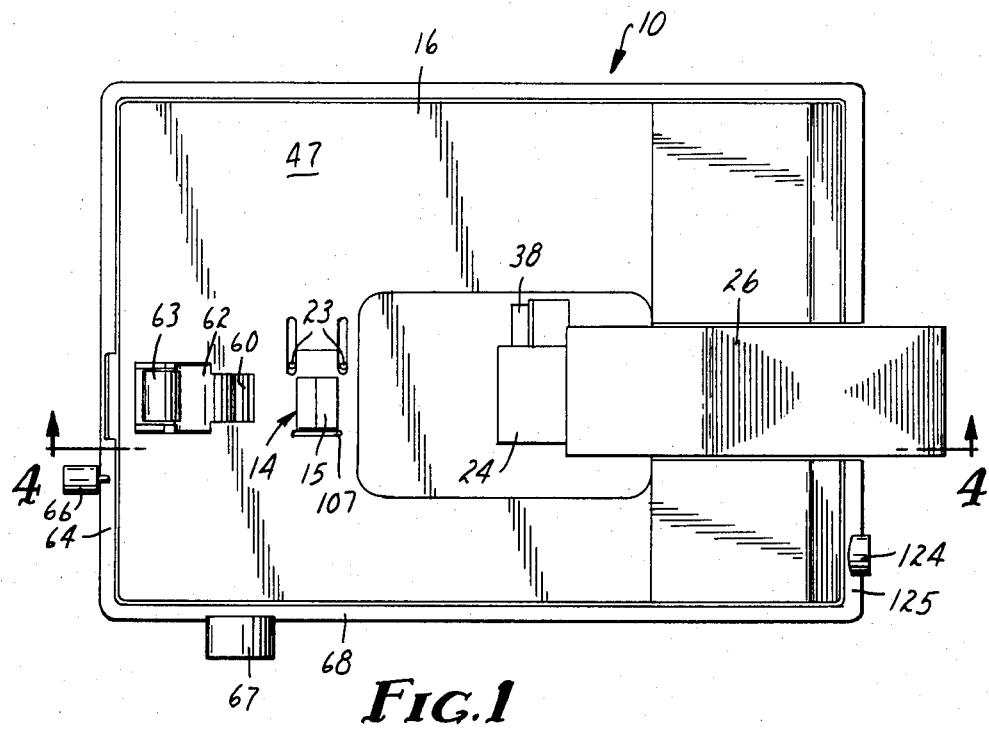
FIG. 1 is a horizontal plan view of a device for forming graphics according to the present invention.

Referring now to the drawing there is shown a device according to the present invention for forming graphics, which device is generally designated by the numeral 10. The device 10 is useful for forming graphics on a composite strip material 12 (FIGS. 4, 9, 12 and 13) of the type previously described, and which is more fully described in U.S. Pat. No. 4,123,578 which issued Oct. 31, 1978, the disclosure whereof is incorporated herein by reference.

Figure 2:
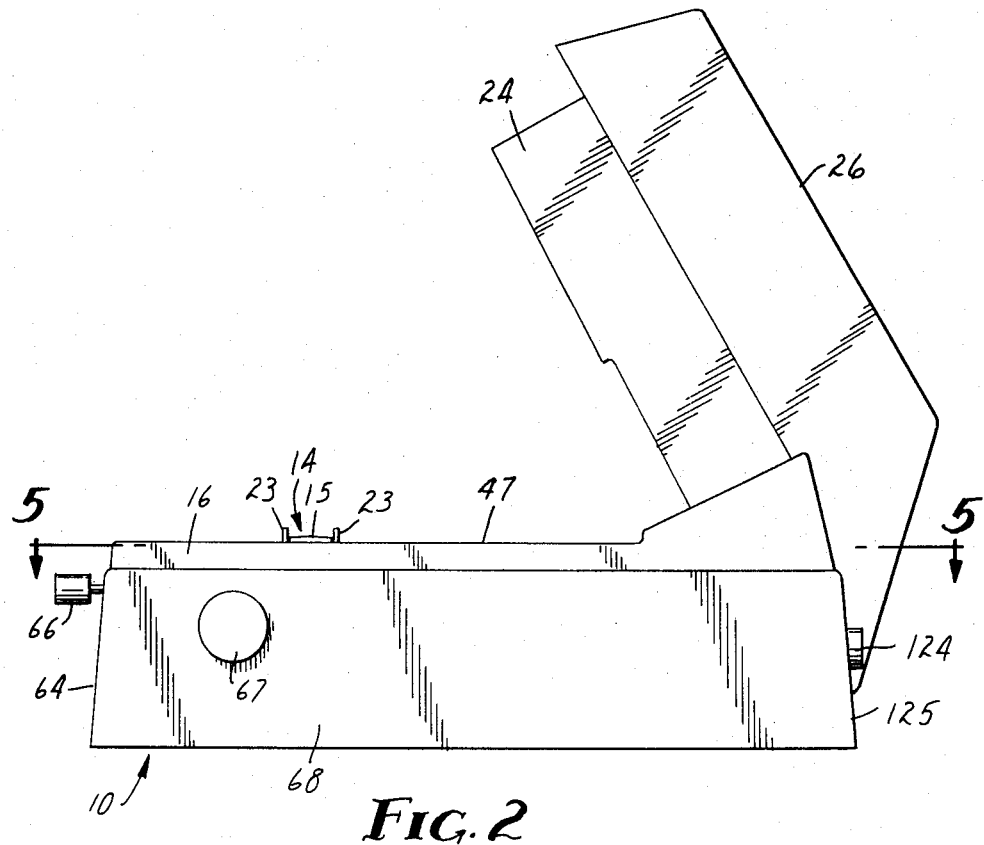
FIG. 2 is a side view of the device of FIG. 1.
Figure 3:
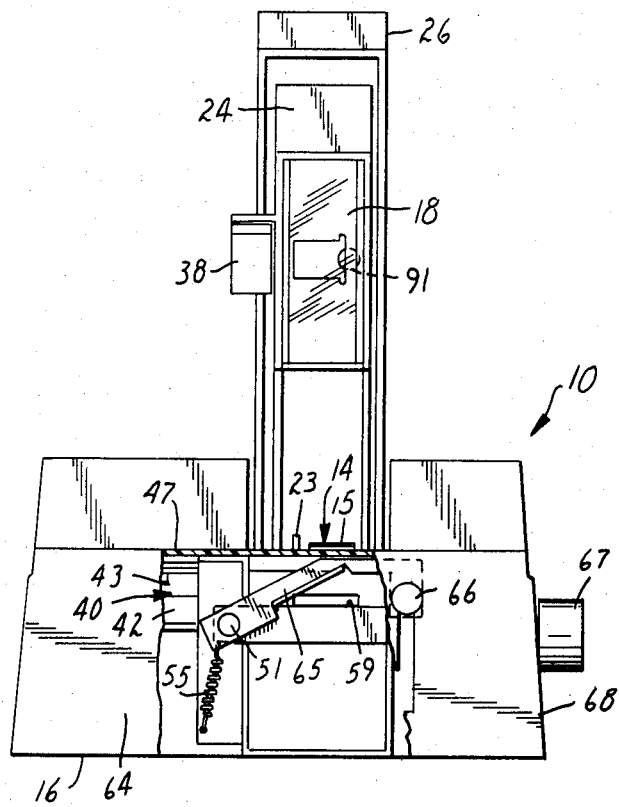
FIG. 3 is a front view of the device of FIG. 1 having parts broken away to show details.
Figure 4:
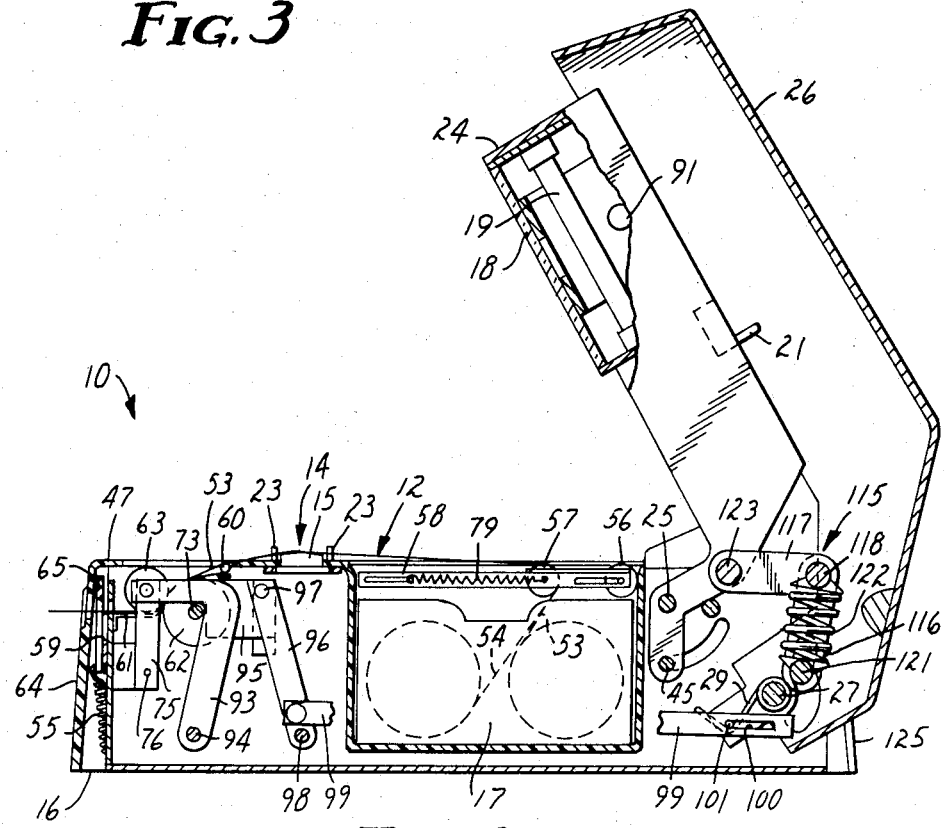
FIG. 4 is a sectional view taken approximately along the line 4—4 of FIG. 1 having parts broken away to show details.

The device 10 includes means for defining an exposure station 14 including a generally rectangular resilient support pad 15 supported on a frame 16 for the device 10, and means adapted for moving the composite strip material 12 along a path from a supply cartridge 17 (FIG. 4) through the exposure station 14 over the pad 15 (FIGS. 4 and 9). Graphics can be serially formed along the strip material 12 (FIGS. 12 and 13) by means for momentarily irradiating the portion of the composite strip material 12 located at the exposure station 14 in a sharply defined graphic pattern. The means for irradiating comprise a xenon flash lamp 19 (FIG. 4) for momentarily irradiating the strip material 12 with intense illumination through one of a plurality of radiation transmissive windows 20 in an otherwise radiation reflective template 22 (FIGS. 10, 12 and 13) located via locating members 23 on the device 10 (FIG. 2), while means for pressing including the resilient pad 15 and an opposed glass plate 18 (FIG. 4) over the lamp 19 presses the template 22 and composite strip material 12 into intimate engagement.

The flash lamp 19 is supported in the distal end of a lamp arm 24, which arm 24 is mounted by a pin 25 (FIG. 4) on the frame 16 for pivotable motion between a normal position for the lamp 19 and the arm 24 (FIGS. 1, 2, 3, 4 and 6), wth the lamp 19 spaced from the exposure station 14; and an expose position for the lamp 19 and the arm 24 (FIG. 8) with the lamp 19 adjacent the exposure station 14. An activating lever 26 is pivotably mounted on the frame 16 by a pin 27 for movement between a second or lowered position (FIG. 8) and a first or raised position spaced from the exposure station (FIGS. 1, 2, 3, 4 and 6) to which raised position the activating lever 26 is biased by a spring 29. The activating lever 26 has an opening adapted to receive a portion of the lamp arm 24 opposite the exposure station 14, and has inwardly projecting ledges adapted to engage outward projections on the lamp arm 24 so that the ledges will engage to move the lamp arm 24 to its normal position as the lamp arm is moved to its raised position under the influence of the spring 29. After the activating lever 26 has been manually moved toward its lowered position to move the lamp arm 24 to its expose position (FIG. 7), the activating lever 26 can be further moved toward its lowered position relative to the lamp arm 24 so that the activating lever 26 moves down over the lamp arm 24 (FIG. 8) and the relative movement therebetween activates the means for pressing the template 22 and the composite strip material 12 together, means including a switch 21 for flashing the lamp 19 to expose the strip material 12 through one of the windows 20 in the template 22 at the exposure station 14, and means for advancing the strip material 12 along the path so that the strip 12 will be advanced to provide a predetermined spacing between the graphics formed as the activating lever 26 and lamp arm 24 move back to their respective raised and normal positions.

The xenon flash lamp 19 and the means for flashing the lamp 19 activated by the switch 21 are essentially the same as those described in U.S. Pat. No. 3,914,775, the description whereof is incorporated herein by reference.

Figure 10:
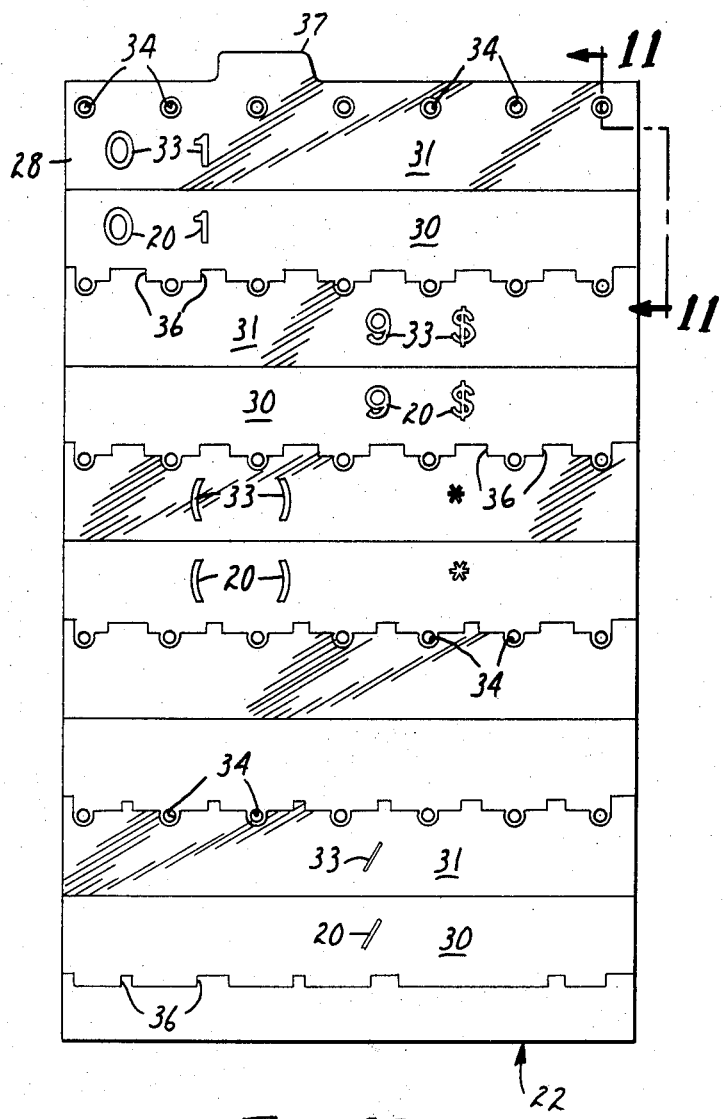
FIG. 10 is a plan view of a template for use on the device of FIG. 1.
Figure 11:
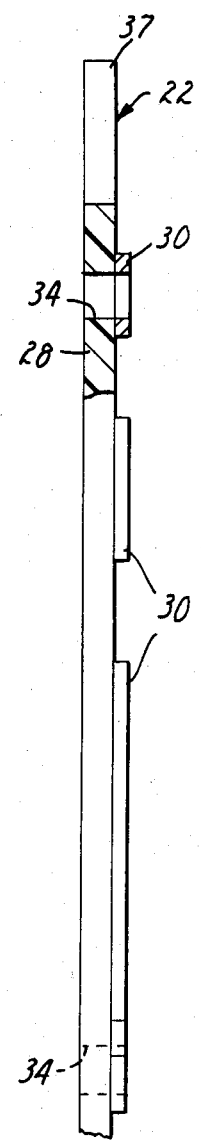
FIG. 11 is an enlarged fragmentary sectional view taken approximately along line 11—11 of FIG. 10.
Figure 12:
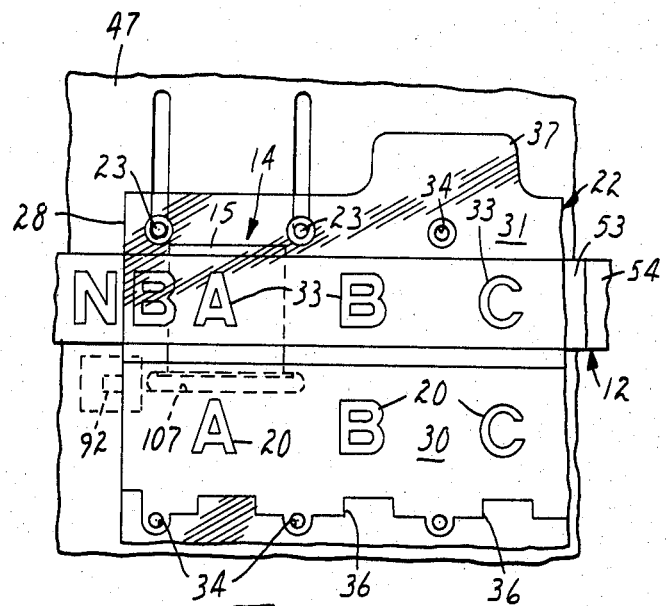
FIGS. 12 and 13 are enlarged fragmentary views showing a preview and an expose position of a template at an exposure station on the device.
Figure 13:
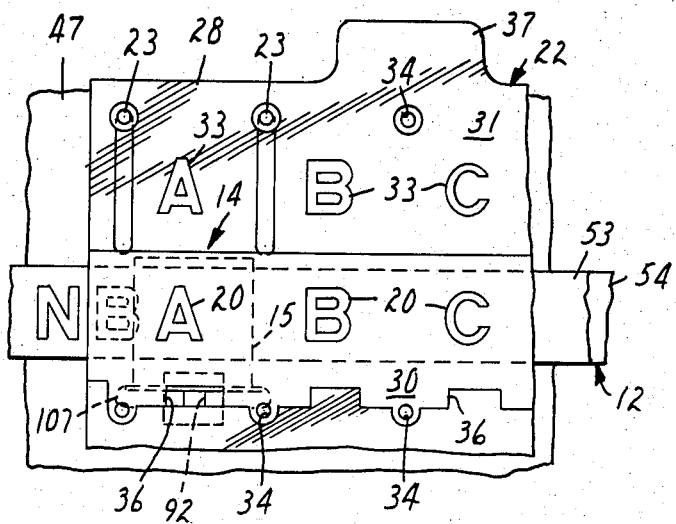

As is seen in FIGS. 10 and 11 the template 22 for use in the device 10 is of the type comprising a thin flexible radiation transparent member 28 (e.g., photographic grade polyester) with a radiation blocking coating 30 (e.g., a reflective vapor coating of copper) having sharply defined open areas corresponding in shape to graphics to be formed to provide the radiation transmissive windows 20 through the template 22, and shaped to provide viewing areas or openings 31 adjacent the windows 20, which template 22, except for the location of the windows 20 and viewing areas 31, is made in accordance with the teachings in U.S. Pat. No. 3,828,359, the content thereof is incorporated herein by reference. Unlike the template described in that patent, however, the template 21 has positive images 33 of the windows 20 in its associated viewing areas 31, which images 33 are each positioned in predetermined relationship with respect to their corresponding window 20, and the template 22 has a pair of locating orifices 34 at a predetermined location with respect to each of the windows 20, which locating orifices 34 are adapted to receive the spaced locating members 23 on the device 10.

The device 10 includes means mounting the locating members 23 for movement between an exposure position at which one of the windows 20 in the template 22 associated with locating orifices 34 in which the locating members 23 are inserted is located at the exposure station 14; and a preview position with the positive image 33 corresponding to that window 20 located at the exposure station 14 in the position at which that window 20 is located when the locating members 23 are in their exposure position; and means coupled between the arm 24 and the means for mounting the locating members 23 for positioning the locating members 23 in their preview position when the lamp arm 24 is in its normal position, and for positioning the locating members 23 in their exposure position when the lamp arm 24 is in its expose position.

Also, for each of the windows 20 the coating 30 on the template 22 has an optically readable code or spacing opening 36 at a predetermined location with respect to that window 20, which spacing opening 36 has a width with a predetermined relationship to the width of that window 20 so that means on the device 10 included in the means for moving the strip material 12 can sense the width of the spacing opening 36 associated with one of the windows 20 located at the exposure station 14 to provide a predetermined spacing between a formed graphic and the next graphic to be formed along the strip material 12.

As is seen in FIG. 10, the windows 20 on the template are in the form of various graphics and are disposed in a compact rectangular array with the viewing opening 31 and image 33 adjacent each window 20 disposed adjacent the top edge of that window 20 with the sides of the associated window 20 and image 33 in alignment, the locating orifice 34 located on the side of the image 33 opposite the window 20 and spaced opposite each other on opposite sides of a centerline through the associated window 20 and image 33, and the spacing opening 36 located adjacent the base of the window 20 with its width being disposed transverse of the window 20. Preferably the array is slightly smaller than the size of a common sheet of paper (i.e., 6½×11 inches or 15.2×27.9 centimeters) to facilitate filing it in a conventional file, and may have a tab 37 on one edge on which may be written information to identify the graphics on the template 22.

Means are provided to facilitate positioning the template 22 on the locating members 23 and for ensuring that the locating members 23 will accurately locate the template 22 on the device 10.

The spaced locating members 23 are vertically disposed, have cylindrical base portions adapted to fit closely in the locating orifices 34, and have truncated conical distal portions to facilitate positioning the locating orifices 34 around the locating members 23. One of the locating orifices 34 for each window is circular so that the base portion of the mating locating member 23 will be received therein in close-fitting engagement on all sides; whereas the other locating orifice 34 for each window 20 is slightly elongate in a direction transverse of the window 20 so that the mating locating member 23 will be received therein with close-fitting relationship on only its two sides parallel to a line joining the centers of the locating members 23. This ensures accurate positioning of the windows 20 with respect to the locating members 23, while eliminating problems with center-to-center tolerances between the locating orifices 34. The arm 25 has a flexible resilient rectangular open cell polymeric foam pad 38 supported from a projection on the arm 24 and adapted to engage and press the template 22 fully onto the lower cylindrical portion of the locating members 23 to ensure accurate location thereon when the arm 24 is moved to its expose position.

The means mounting the locating members 23 for movement between their expose and preview positions (best seen in FIG. 5) includes a commercially available linear drawer slide 40 comprising a first part or track 42 fixed to the frame 16 and extending transverse of the path for the strip 12, and a second movable part 43 on which the locating members 23 are fixed mounted via ball bearings for linear movement along the track 42.

The means coupled between the lamp arm 24 and the means for mounting the locating members 23 (best seen in FIG. 5) comprises a drive pin 45 carried parallel to the pivot pin 25 for the lamp arm 24 by spaced projections on the lamp arm 24, and a bar 46. The bar 46 has a central portion mounted on the frame 16 via a headed retaining post 44 extending through a longitudinally aligned slot in the central portion of the bar 46 for longitudinal sliding movement in a direction parallel to a top surface 47 of the frame 16; one generally U-shaped end portion 48 defining a vertical slot in which an end of the drive pin 45 is located; and a cam plate portion 49 at its opposite end having a cam slot 50 in which is received a vertical projection 52 fixed to the movable part 43 of the drawer slide 40. Movement of the lamp arm 24 will cause the drive pin 45 to move in an arcuate path with the horizontal component of such movement sliding the bar 46 along a linear path so that its cam plate portion 49 will drive the projection 52 transverse of the cam plate portion 49 and thereby move the movable portion 43 of the slide 40 and thereby the locating members 23 between their preview and exposure positions. The end portions of the cam slot 50 are aligned parallel to the path of movement of the bar 46 so that small differences in the location of the lamp arm 24 in its normal or expose positions will not affect the corresponding location of the locating members 23 in their preview or expose positions to ensure accurate positioning thereof.

The path for the strip material 12 through the exposure station 14 is best seen in FIGS. 4 and 9. The composite strip material 12 comprises two separate coated webs, each stored in wrapped condition on a separate reel within the supply cartridge 17, which cartridge 17 is received in a socket in the frame 16. The webs include a receiving web 53 having a layer of waxy material firmly adhered to one surface, and a donor web 54 having a releasably adhered layer of microgranules. The webs 53 and 54 extend through an outlet slot in the cartridge 17, around one of two different guide rollers 56 and 57 (i.e., either the roller 56 which is wide for guiding wide strip material, or the roller 57 which is narrow for guiding narrow strip material), which rollers 56 and 57 are mounted on a bracket 58 slidably mounted on the frame 16 (which provides a part of means that allow the strip material 12 to be moved in both directions along the path past the exposure station 14 as will later be explained), and then across the pad 15 at the exposure station 14 with the layer of waxy material and layer of microgranules in face-to-face contact. From the exposure station 14 the webs 53 and 54 extend on opposite sides of a pin 60 which will separate the webs 53 and 54 so that graphics formed on all types of strip material 12 will be easily visible through the outer surface of the web 53 and may be viewed by an operator adjacent the exposure station 14. From the pin 60 the strip material 12 extends between a driven roller 62 and an idler roller 63, along a guide chute 61, through means for severing the composite strip material 12, and out of a first end wall 64 of the frame 16.

The means for severing the composite strip material 12 comprises an edge 59 on the frame transverse of the path for the strip material 12 and a cutting arm 65 pivotably mounted on the frame 16 by a pin 51, which arm 65 has an edge adapted for shearing engagement with the edge 59 on the frame to sever the strip material 12 therebetween. The cutting arm 65 is biased by a spring 55 to a normal position (shown in FIG. 3) with its edge spaced from the edge 59 on the frame 16, and is manually movable in opposition to the spring 55, to sever the strip material 12 via a knob 66 projecting from the first wall 64 on the frame 16.

Figure 5:
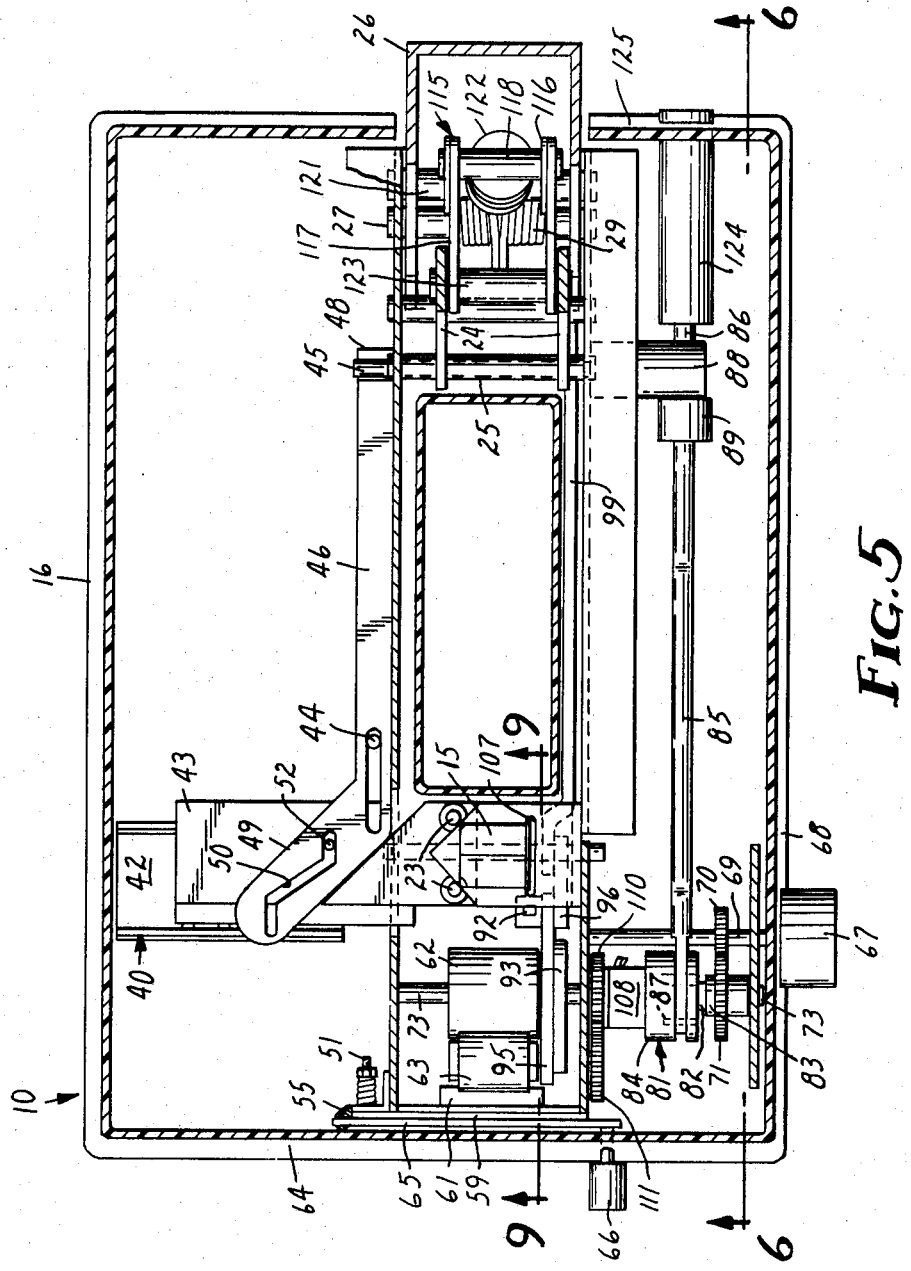
FIG. 5 is an enlarged sectional view taken approximately along the line 5—5 of FIG. 2.
Figure 6:
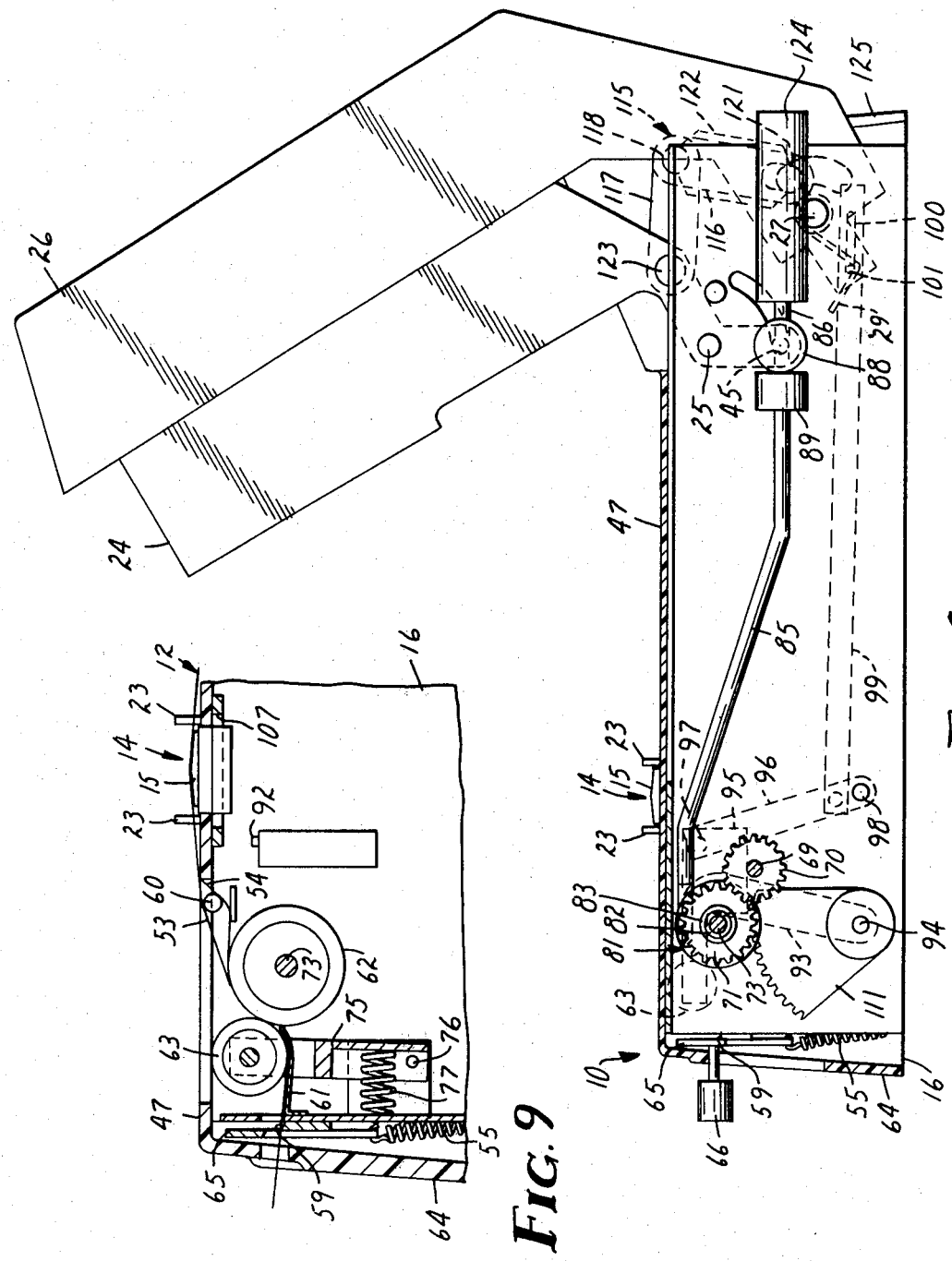
FIGS. 6, 7 and 8 are sectional views taken approximately along the line 6—6 of FIG. 5 which sequentially show movement of an arm on the device to form a graphic.
Figure 7:
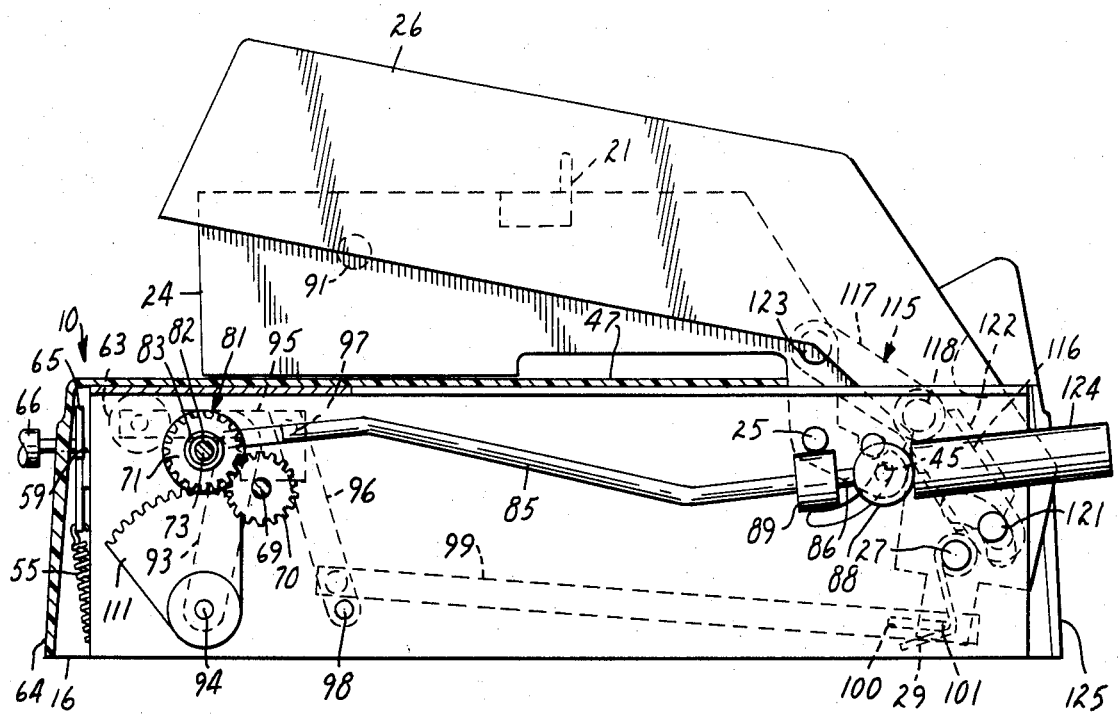

The means for moving the strip material 12 along the path from the supply cartridge 17, past the exposure station 14, and out of the outlet opening (which includes the means for providing a predetermined spacing between graphics and means for manually moving the strip material 12 in either direction along the path past the exposure station 14) is best seen in FIGS. 4, 5 and 6. The means for manually moving the strip material 12 is operated by a knurled knob 67 projecting from a side wall 68 of the frame 16. The knob 67 is attached to a shaft 69 rotatably mounted on the frame 16 and having affixed thereto a spur gear 70 meshed with a spur gear 71 fixed to a shaft 73 rotatably mounted on the frame 16 on which shaft 73 the drive roller 62 is also fixed. The idler roller 63 is rotatably mounted on a support bracket 75 (FIG. 9) which support bracket 75 is pivotably mounted on the frame 16 at a pin 76 and biased by a spring 77 so that the idler roller 63 will press the strip material 12 along the path into driving engagement with the drive roller 62.

The slidable bracket 58 is biased by a spring 79 to its position most distant from the drive roller 62. Friction between the webs 53 and 54 and the reels in the cartridge 17 when the strip material 12 is advanced along the path (as by rotation of the knob 67) will cause the bracket 58 and guide rollers 56 and 57 to move toward the drive roller 62 in opposition to the spring 79. If it is then desired to return the strip 12 past the exposure station 14 toward the cartridge 17 (e.g., to adjust spacing between graphics), this can normally be done by rotation of the knob 67 which will allow the spring 79 to move the frame away from the drive roller 62 to pull the strip material 12 over the pad 15 away from the drive roller 62 and maintain tension in the strip material 12 over the pad 15.

The means for moving also includes means for moving a sensor 92 across the width of the spacing opening 36 associated with any one of the windows 20 in the template 22 positioned at the exposure station 14 and for producing an electrical signal when the sensor 92 is adjacent the spacing opening 36; and means activated by that electrical signal for rotating the drive roller 62 through an angle determined by the width of that spacing opening 36 during movement of the lamp arm 24 and activating lever 26 from their respective normal and raised positions to their expose and lowered positions and back to their normal and raised positions to advance the strip 12 past the exposure station 14 a distance related to the graphic formed and provide a predetermined spacing between that graphic and the next graphic to be formed along the strip 12. The means activated by the electrical signal includes a one-way clutch 81 (FIG. 5) having a first or inner sleeve-like half 82 rotatably mounted about the shaft 73 and coupled via a friction clutch 83 to the gear 71 which is fixed to the shaft 73 on which shaft 73 the drive roller is also fixed. A second generally cylindrical outer half 84 of the one-way clutch 81 is positioned around the inner half 82 and is in driving engagement therewith upon rotation of the outer half 84 in a first direction relative to the inner half 82 (counter clockwise as viewed in FIG. 6); but is relatively movable upon rotation of the outer half 84 in a second direction relative to the inner half 82 (clockwise as viewed in FIG. 6). Linkage means are coupled between the outer half 84 of the one-way clutch 81 and the lamp arm 24 and have portions relatively movable from a first relative position with the portions in engagement with each other to position the outer half 84 of the one-way clutch 81 at a start position when the lamp arm 24 is in its normal position, and to permit the lamp arm 24 to move to its expose position without moving the outer half 84 of the clutch 81 away from its start position. These portions comprise a first portion or rod 85 having a first end part pivotably mounted eccentrically via a pin 87 to the outer half 84 of the one-way clutch 81; and a second portion or boss 88 fixed at an end of the drive pin 45 carried by the extensions on the lamp arm 24 and having a through opening which slideably receives a second end part 86 of the rod 85. A stop 89 is fixed at a predetermined position on the rod 85 so that via engagement with the stop 89 the boss 88 will reposition the outer half 84 of the one-way clutch 81 in its start position subsequent to a displacement therefrom when the lamp arm 24 returns to its normal position, however, sliding movement of the boss 88 along the rod 85 will normally allow the lamp arm 24 to be moved to its exposure position without moving the rod 85 to displace the outer half 84 of the one-way clutch 81.

One half of an electric clutch 108 is coupled to the outer half 84 of the one-way clutch 81, with the other half of the electric clutch 108 being driven first in one direction and then in another by electric clutch drive means (later to be explained) operated by reciprocating relative movement between the lamp arm 24 and the activating lever 26 after the lamp arm 24 reaches its expose position (see FIGS. 7 and 8), which relative movement also moves the sensor 92 first in one direction and then in the other across the spacing opening 36 associated with the window 20 at the exposure station 14. The electric clutch 108 is activated via the sensor 92 when the sensor 92 is adjacent that spacing opening 36. As the activating lever 26 moves toward its lowered position, such activation of the electric clutch 108 will attempt to drive the outer half 84 of the one-way clutch 81 in the direction in which it is engaged with its inner half 82 and via the friction clutch 83 could drive the shaft 73 to rotate the drive roller 62 and advance the strip material 12 along the path. The electric clutch 108, however, is sized so that it cannot transmit sufficient torque to rotate the one-way clutch 81 in that direction and thus will slip. When the activating lever 26 moves relative to the lamp arm 24 from its lowered position back toward its raised position, however, such activation of the electric clutch 108 will transmit sufficient torque to the outer half 84 of the one-way clutch 81 to rotate the outer half 84 from its start position relative to its inner half 82 through an angle related to the width of the spacing opening 36 associated with the window 20 at the exposure station 14. Subsequently when, via engagement of the ledges on the activating lever 26 and arm 24, the activating lever 26 returns the lamp arm 24 to its normal position under the influence of the spring 29, the boss 88 will engage the stop 89 and return the outer portion 84 of the one-way clutch 81 to the start position. Such movement of the outer portion 84 will rotate the inner portion 82 of the one-way clutch 81, and via the friction clutch 83 will also rotate the shaft 73 and drive roller 62 to advance the strip material 12 along its path a distance related to the width of the spacing opening 36 associated with the window 20 at the exposure station 14.

The means for sensing the width of the spacing opening 36 includes means for directing light through the spacing opening 36 associated with the window in the template located at the exposure station 14 provided by a continuously activated light 91 in the lamp arm 24 (FIGS. 3 and 4), and means coupled to the activating lever 26 for moving the light sensor 92 (FIGS. 4 and 5) back and forth across the width of the spacing opening 36 associated with the window 20 located at the exposure station 14 during the reciprocating relative movement between the activating lever 26 and lamp arm 24 that occurs after the lamp 19 reaches its exposure position, and for producing an electrical signal to activate the electric clutch 108 during the time the sensor 92 receives light through that spacing opening 36.

Figure 8:
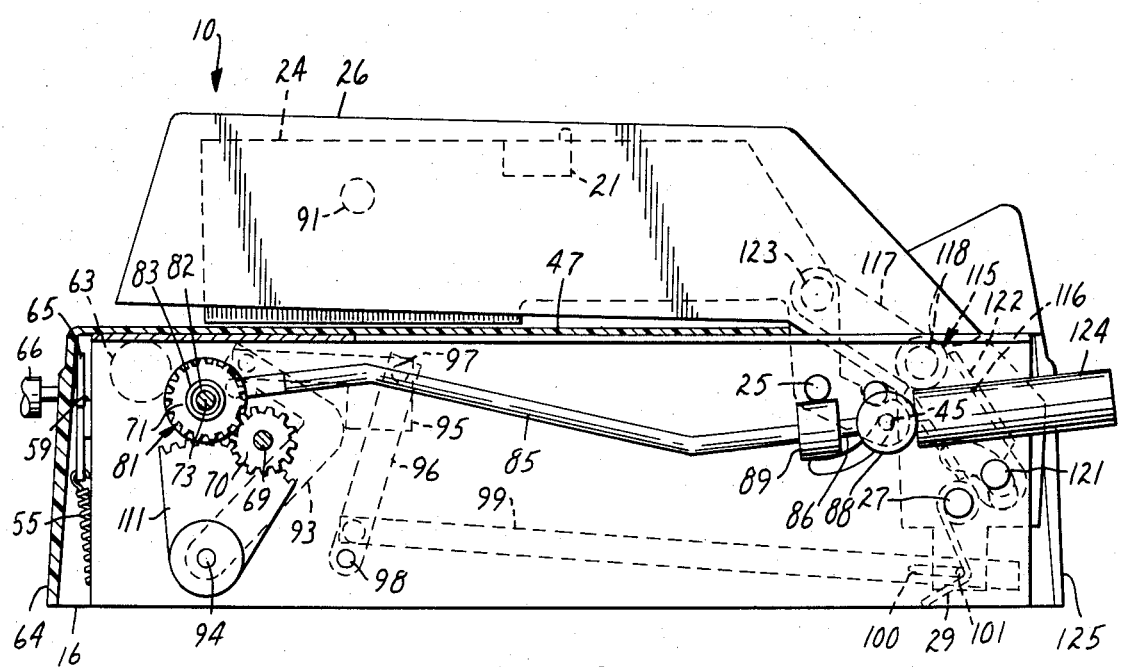

The means for moving the sensor 92 are provided by a linkage including a first inverted L-shaped bar 93 (FIG. 4) fixed at one end to a pin 94 pivotably mounted on the frame 16, and pivotably carrying a carrier link 95 at its opposite end, on which carrier link 95 the sensor 92 is fixed. At its end opposite the L-shaped arm 93 the carrier link 95 is pivotably attached to one end of a straight bar 96 via a pin 97, which straight bar 96 is pivoted on the frame via a pin 98 at its end opposite the carrier link 95. Pivoting movement of the bars 93 and 96 allows the sensor 92 to move along a slot 107 at the exposure station between a beginning position (FIGS. 4 and 7) adjacent the end wall 64, and an ending position (FIG. 8). A crank 99 is pivotably attached to the straight bar 96 adjacent the pin 98 and has a longitudinal slot 100 in its opposite end in which is positioned a drive pin 101 carried by an extension on the activating lever 26. The slot 100 is positioned so that the drive pin 101 will engage one end of the slot 100 and position the sensor 92 in its beginning position when the activating lever 26 returns the arm 24 to its normal position, and the drive pin 101 can move to the other end of the slot 100 without moving the sensor 92 as the activating lever 26 moves the lamp arm 24 to its expose position. Subsequently upon movement of the activating lever 26 relative to the lamp arm 24 with the lamp arm 24 in its expose position the drive pin 101 will move the crank 99 and thereby the sensor 92 from its beginning to its ending position and then back to its beginning position along the slot 107 adjacent the light 91 and across the spacing opening 36 associated with the window 20 at the exposure station 14. The sensor will only receive light from the light 91 as the sensor 92 crosses that spacing opening 36. Via an appropriate conventional control circuit (not shown) the sensor 92 will trigger the electrical signal which engages halves of the electric clutch 108 while it receives light from the light 91. A sector gear 111 is fixed on the pin 94 by which the inverted L-shaped arm is pivoted on the frame 16 and is meshed with a spur gear 110 fixed to half of the electric clutch 108 so that such movement of the crank 99 via relative movement between the activating lever 26 and lamp arm 24 will also provide the means for driving half of the electric clutch 108 first in one direction and then in the other as the sensor 92 is moved back and forth, and thus for rotating the outer half 84 of the one-way clutch 81 away from its start position during the time the electrical signal is received when the sensor 92 moves from its ending position back to its beginning position. Thus when the activating lever 26 returns the arm 24 to its normal position, engagement of the boss 88 and stop 89 will return the outer half 84 of the one-way clutch 81 to its start position and via the friction clutch 72 will rotate the roller 62 through an angle related to the width of the spacing opening 36 associated with the window 20 at the exposure station 14.

The novel pressing means for pressing the template 22 and the strip material 12 together at the exposure station 14 via relative movement between the activating lever 26 and the arm 24 comprises a toggle linkage 115 including parallel first and second sets of bars 116 and 117 having adjacent ends pivotably joined together at a pin 118 to form a knee and opposite second ends. The second ends of the first bars 116 are pivotably attached to the frame 16 at a pin 121 and the second ends of the second bars 117 are pivotably attached to the lamp arm 24 at a pin 123. The pivotably mounted activating lever 26 has a portion adapted to engage the knee and straighten the toggle linkage 115 during pivotal movement of the actuating lever 26 from its raised to its lowered position after the lamp arm 24 has been moved to its expose position. Such straightening of the toggle linkage 115 presses the glass plate 18 over the lamp 91 toward the pad 15 and firmly presses the template 22 and strip material 12 together therebetween.

The second ends of the first pair of bars 116 are slotted to afford longitudinal movement of the first set of bars 116 relative to the pin 121, and the means for pressing includes a stiff coil spring 122 between the pin 121 on the frame 16 and the knee aligned with the first pair of bars 116 for applying generally uniform pressure between the plate and the pad 15 upon movement of the actuating lever 26 to its actuating position.

The device further includes means for providing an additional amount of spacing between graphics formed along the strip material 12 in addition to the spacings provided by the spacing openings 36 on the template 22.

A tube 124 is threadably engaged with the end portion 86 of the rod 85 opposite the one-way clutch 81 and extends through a rear wall 125 of the frame 16 where it can be manually engaged and rotated between a normal position where it will not be contacted via the boss 88 upon movement of the lamp arm 24 to its expose position (in which normal position no additional spacing will be provided); and positions where the tube 124 will be contacted by the boss 88 during movement of the lamp arm 24 to its expose position and will rotate the outer half 84 of the one-way clutch 81 a predetermined distance from its start position (which will be in addition to rotation of the outer half 84 caused by the electric clutch 108 during subsequent relative movement between the activating lever 26 and lamp 24) so that upon return of the lamp arm 24 to its normal position the one-way clutch 81 will rotate the drive roller 62 through an arc in addition to the arc through which it would otherwise be rotated due to the width of the spacing opening 36 associated with the window 20 at the exposure station 14. Thus an additional predetermined spacing will be provided between the graphics formed along the strip material 12.

OPERATION

To use the device to form graphics along the strip material 12, an operator first selects a template 22 having a positive image 33 corresponding to a graphic he wishes to form, positions the locating orifices 34 associated with that window 20 on the locating members 23 of the device 10, checks the relationship of the positive image 33 associated with that window 20 with the adjacent graphic (if any) on the strip material 12, and presses the actuating lever 26 toward the exposure station 14. Such movement of the actuating lever 26 moves the lamp arm 24 toward the exposure station 14, causing the locating members 23 to be moved from their preview position to their exposure position so that the desired window 20 will be positioned over the strip material 12 and the pad 15. Such movement of the locating members 23 is caused by movement of the bar 46 which is driven by the pin 45 on the lamp arm 24, and in turn drives the movable part 43 of the drawer slide 40 on which the locating members 23 are mounted via engagement of the projection 52 in the cam slot 50. During such movement of the lamp arm 24, the boss 88, also mounted on the pin 45, will slide along the end portion 86 of the rod 85 away from the stop 89. When the lamp arm 24 reaches its expose position with the glass plate 18 pressed against the strip material over the pad 15, movement of the lamp arm 24 will stop. The actuating lever 26 will then be manually moved relative to the lamp arm 24 to first engage and straighten the toggle linkage 115 between the frame 16 and lamp arm 24 to firmly press the glass plate 18 against the portion of the template 22 over the strip material 12 and the pad 15. The pad 15 has a tented upper surface extending transverse of the path for the strip material 12 so that such pressure will cause the pad to be compressed from its central portion outwardly to its edges along the path for the strip material, thereby sweeping air from between the webs 53 and 54 of the strip material 12 at the exposure station to ensure intimate engagement therebetween.

Such relative movement of the actuating lever 26 with respect to the lamp arm 24 will also cause (via the crank 99 and the bars 93 and 96 and carrier link 95) movement of the sensor 92 along the slot 107 in the frame and across the spacing opening 36 associated with the window 20 at the exposure station 14 which is positioned over the slot 107 and one half of the electric clutch 108 to be rotated via the spur gear 110, sector gear 111, pin 98 and crank 99. Light emitted from the light 91 will be received by the sensor 92 as it traverses that spacing opening 36 and while the sensor 92 receives light it will trigger an electrical signal to activate the electric clutch 108. The halves of the electric clutch 108 will slip, however, since the clutch 108 cannot transmit sufficient torque to move the drive roller 62 via the one-way clutch 81 and friction clutch 83.

When the actuating lever 26 reaches its lowered position, engagement of the actuating lever 26 with the switch 21 mounted on the lamp arm 24 will flash the flash lamp 19 so that it irradiates the strip material 12 and forms a graphic therein corresponding to the window 20 at the exposure station 14.

Subsequently as the actuating lever 26 starts to return to its raised position under the influence of the spring 29, initial relative movement between the activating lever 26 and the lamp arm will move the sensor 92 in the other direction across the spacing opening 36 associated with the window at the exposure station 14. The sensor 92 will again receive light from the light 91 as it traverses the spacing opening 36 so that the electric clutch 108 will be activated. When the electric clutch is activated it will transmit sufficient torque between the halves of the electric clutch 108 (which are now rotated in the opposite direction) to rotate the outer half 84 of the one-way clutch 81 in its release direction around its inner half 82, and move the bar 85 and the stop 89 fixed thereon toward the boss 88 a distance related to the width of the spacing opening 36 at the exposure station 14. Subsequently when the activating lever 26 returns to its raised position under the influence of the spring 29 and returns the lamp arm 24 to its normal position, engagement of the boss 88 with the stop 89 will return the outer half 84 of the one-way clutch 81 to its start position and rotate the inner half 82 of the one-way clutch 81, thereby rotating the drive roller 62 via the friction clutch 72, gear 71, and shaft 73, to advance the strip material 12 along its path by a distance related to the width of the spacing opening 36 associated with the window 20 at the exposure station 14, and thus produce a predetermind spacing between that graphic and the next graphic to be formed along the strip material 12.

Subsequent graphics can similarly be formed along the strip material 12. Should the operator desire to provide spacing between subsequent graphics in addition to that automatically provided by the spacing openings 36, he may do so by rotating the internally threaded tube 124 to move it toward the stop 89 so that it will be engaged by the boss 88 as the lamp arm 24 is moved from its spaced to its expose position. This will rotate the outer half 84 of the one-way clutch 81 a distance additional to that which it will be rotated via the mechanism responsive to the sensor 92 so that as the lamp arm 24 returns from its expose to its normal position, the drive roller 62 will be rotated an additional amount to provide the additional spacing. Should the operator desire to manually adjust the spacing between graphics to be formed along the strip material, he may also do that by manually rotating the knob 67, which knob 67 may be rotated either to advance the strip material 12 along the path, or to return the strip material 12 toward the supply cartridge 17. If the strip material 12 is moved toward the supply cartridge 17, the spring 79 will move the frame 58 upon which the guide rollers 57 and 56 are mounted to maintain tension in the portion of the strip material 12 over the pad 15.

After a desired sequence of graphics is formed it may be severed from the strip material 12 still in the device 10 by actuating the cutting arm 65 via the knob 66.

I claim:

1. In a device useful for forming a series of graphics such as letters, symbols or pictures along a strip of radiation sensitive material, said device comprising:
   a frame;
   means on said frame for defining an exposure station;
   means mounted on said frame adapted for moving a said strip through said exposure station to position a predetermined portion of the strip at said exposure station; and
   means adapted to be actuated at said exposure station for momentarily irradiating a portion of the strip at said exposure station in a sharply defined graphic pattern, including:
   a template comprising a thin radiation transparent member with a radiation blocking coating having sharply defined open areas corresponding in shape to graphics to be formed to provide radiation transmissive windows through said template;
   means on said frame for mounting said template to register the windows at said exposure station;
   pressing means for releasably clamping said template at said exposure station in intimate contact with the portion of the strip at the exposure station; and
   radiation means for briefly irradiating the portion of the strip at said exposure station through the aligned window, comprising flash lamp, an arm supporting said flash lamp at one end and having a second end mounted on said frame for pivotal movement to move said lamp between a normal position spaced from said exposure station to afford visible inspection of said template and the portion of the strip at said exposure station, and an expose position with said lamp closely adjacent the exposure station, and means for operating said flash lamp upon movement of the lamp to its expose position and activation of said pressing means, the improvement wherein:
   said means for defining an exposure station comprises a resilient pad supported on said frame;
   said arm includes a transparent plate having one surface adapted to engage radiation sensitive material at said exposure station on its side opposite said resilient pad and supports said lamp adjacent the surface of said plate opposite said one surface; and
   said pressing means comprises a toggle linkage including first and second bars having adjacent ends pivotably joined together to form a knee and opposite second ends, the second end of said first bar being pivotably attached to said frame and the second end of said second bar being pivotably attached to said arm; and an activating lever pivotably mounted at one end on said frame and having a portion adapted to engage said knee and straighten said toggle linkage upon pivotal movement of said actuating lever from a raised to a lowered position to move said arm to said expose position and press said plate toward said pad.

2. A device according to claim 1 wherein the second end of said first bar is mounted on said frame to afford longitudinal movement of said first bar relative to said frame, and said means for pressing includes a spring between said frame and said knee aligned with said first bar for applying generally uniform pressure between said plate and said pad upon movement of said actuating lever to its actuating position.

* * * * *